US012702880B2

(12) United States Patent
Sweeting, III

(10) Patent No.: US 12,702,880 B2
(45) Date of Patent: Aug. 11, 2026

(54) FIREFIGHTING APPARATUS AND METHOD OF FLUID DISPERSION

(71) Applicant: William C Sweeting, III, El Sobrante, CA (US)

(72) Inventor: William C Sweeting, III, El Sobrante, CA (US)

( * ) Notice: Subject to any disclaimer, the term of this patent is extended or adjusted under 35 U.S.C. 154(b) by 159 days.

(21) Appl. No.: 18/607,780

(22) Filed: Mar. 18, 2024

(65) Prior Publication Data

US 2025/0288836 A1 Sep. 18, 2025

(51) Int. Cl.
*A62C 31/02* (2006.01)
*A62C 27/00* (2006.01)

(52) U.S. Cl.
CPC .............. *A62C 31/02* (2013.01); *A62C 27/00* (2013.01)

(58) Field of Classification Search
CPC . A62C 31/02; B21K 1/16; F16L 33/00; F16L 33/22; F16L 55/1725
See application file for complete search history.

(56) References Cited

U.S. PATENT DOCUMENTS 5,904,376 A * 5/1999 Yuen ..................... F16L 33/223 285/39
2016/0361481 A1* 12/2016 Lisitschew ............. B01D 61/28
2019/0383432 A1* 12/2019 Greco ................... F16L 41/021

* cited by examiner

*Primary Examiner* — Phutthiwat Wongwian
*Assistant Examiner* — Jacek Lisowski

(57) ABSTRACT

Embodiments presented provide for a firefighting apparatus and method of fluid dispersion for use during firefighting. In embodiments, a firefighting fluid is proportionally added to a working stream in an instantaneous manner to prevent fire spread and effectively quell fire propagation.

13 Claims, 5 Drawing Sheets

FIREFIGHTING APPARATUS AND METHOD OF FLUID DISPERSION

CROSS-REFERENCE TO RELATED APPLICATIONS

None.

FIELD OF THE DISCLOSURE

Aspects of the disclosure relate to firefighting apparatus. More specifically, aspects of the disclosure relate to instantly deployable firefighting technology and methods of immediate fluid dispersion.

BACKGROUND

Safety is desired for society and such safety comes in many forms. Fire, while beneficial to society, has significant drawbacks when it is unchecked. History is replete with instances where fire has destroyed significant amounts of property and caused untold numbers of deaths.

Since early human history, mankind has attempted to control the spread of fire. Today, there are numerous apparatus and techniques to fight fire and protect life and property. Despite the amount of time that has passed, improvements are needed as property and life are still in jeopardy.

As society has progressed, new challenges are encountered by communities facing fire threats. Unfortunately, due to the amount of economic uncertainty, many individuals who would ordinarily reside in well-built and fire protected communities now reside in crowded locations with poor or no fire protection. Densely populated locations, such as California, have seen a great increase of mobile, unhoused, or homeless encampments. Such encampments are subject to fire threat on a constant basis. As the homeless encampments are generally located in areas with poor or little permanent fire protection services; mobile fire services, such as fire engines, are used to respond to threats.

When fires occur in these locations, the fires are typically extinguished within an hour, but the fire load components encountered are the same as or more dangerous than a typical house or structure fire. For example, many of these fires encountered include vehicles, compressed gas containers, chemical containers, combustible liquids, and debris, just in a compacted area (typically like a room and contents fire). The inclusion of these materials increases the complexity of firefighting in these areas. Materials that burn are classified in different manners. The lowest classification, class A, ordinary combustibles including conventional wood and paper. Technologies for handling such materials is well known by the firefighting industry. The encampments newly encountered by firefighters present more significant challenges. A difference is that the increased amount of hazardous combustible plastics and Class B liquids that are encountered due to the large volumes of surrounding debris and garbage, when compared to an equivalent, standard size, residential home fire. There is a need to properly address these solids and liquids by mobile firefighting apparatus.

Conventional approaches and apparatus include fighting fires with a carcinogenic foam to extinguish more difficult fires. The conventional methods include the setup of a heavy five (5) gallon bucket of solution that is ejected by the firefighters to end the fire. The bucket or container is located on top of the firefighting apparatus. The materials are set-up at the site of the fire; wasting precious time. Often, when life and limb are at stake, mere seconds are vital.

Current conventional, firefighting, foam, design applications, e.g. the Akron Inline foam eductor, have a short maximum distance capability to deliver foam from the water supplying, firefighting, engine pump and eductor, foam, bucket setup (when foam solution is not directly introduced to the tank and pump itself). The standardized AFFF Aerating Nozzle in use in many municipal fire departments (depending on individual organizational policy) only typically allows a maximum 200 foot hose stretch distance from the roughly 40 pound, 5 gallon, AFFF foam bucket ground and anchor placement location. It takes from two to five minutes to deploy the foam eductor system properly, requiring coordinated communication of at least two to three fire personnel. Fire, during the growth stage, in general, doubles in area, size, and intensity every minute.

There is a need to provide an apparatus that does not have the time intensive set-up time of conventional apparatus.

There is a further need to provide a method for firefighting that saves precious time compared to conventional methods.

There is a need to provide a firefighting apparatus and methods that are quickly and easily deployable by firefighters to control fire spread.

There is a further need to provide apparatus and methods to fight fires that may be used with current firefighting equipment.

There is a further need to provide firefighting apparatus that do not have the drawbacks discussed above.

There is a still further need to reduce economic costs associated with firefighting operations and apparatus described above with conventional tools.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are; therefore, not to be considered limiting of its scope, for the disclosure may admit to other equally effective embodiments without specific recitation. Accordingly, the following summary provides just a few aspects of the description and should not be used to limit the described embodiments to a single concept.

In one non-limiting embodiment, a method for dispersion of a combination of fluids while fighting a fire is disclosed. The method may comprise connecting a hose at a first end with a prime mover. The method may also comprise transporting a nozzle at a second end of the hose to a location remote from the prime mover. The method may also comprise starting a flow of water from the prime mover through the hose to the nozzle at the second end of the hose. The method may also comprise actuating a flow of a second fluid to be added to the flow of water, wherein an amount of the second fluid added to the flow of water may be controlled by a firefighter.

In another example embodiment, an apparatus is disclosed. The apparatus comprises a body having a first end, a second end, and a third end, wherein the first end has external mating threads and the second end has internal mating threads. The apparatus further comprises a nut connected to the body. The apparatus further comprises a collar connected to the nut at the third end, wherein the body has a fluid pathway extending from the first end to the second end and an internal bore is established from the third end through the collar and the nut to intersect the fluid pathway.

In another example embodiment, an apparatus is disclosed. The apparatus comprises a body having a first end, a second end, and a third end, wherein the first end has external mating threads and the second end has internal mating threads. The apparatus further comprises a nut connected to the body at the third end. The apparatus further comprises a collar connected to the nut, wherein the body has a fluid pathway extending from the first end to the second end and an internal bore is established from the third end through the collar and the nut to intersect the fluid pathway, and wherein the collar is configured with a mechanical connection that will transport a fluid through the collar, the nut, and into the fluid pathway, thereby mixing a first fluid stream traveling along the fluid pathway and a second fluid stream flowing along the internal bore and further comprising an exit channel that establishes a connection between the fluid pathway and the internal bore, wherein the exit channel has a curvilinear shape.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted; however, that the appended drawings illustrate only typical embodiments of this disclosure and are therefore not be considered limiting of its scope, for the disclosure may admit to other equally effective embodiments.

Figure 1:
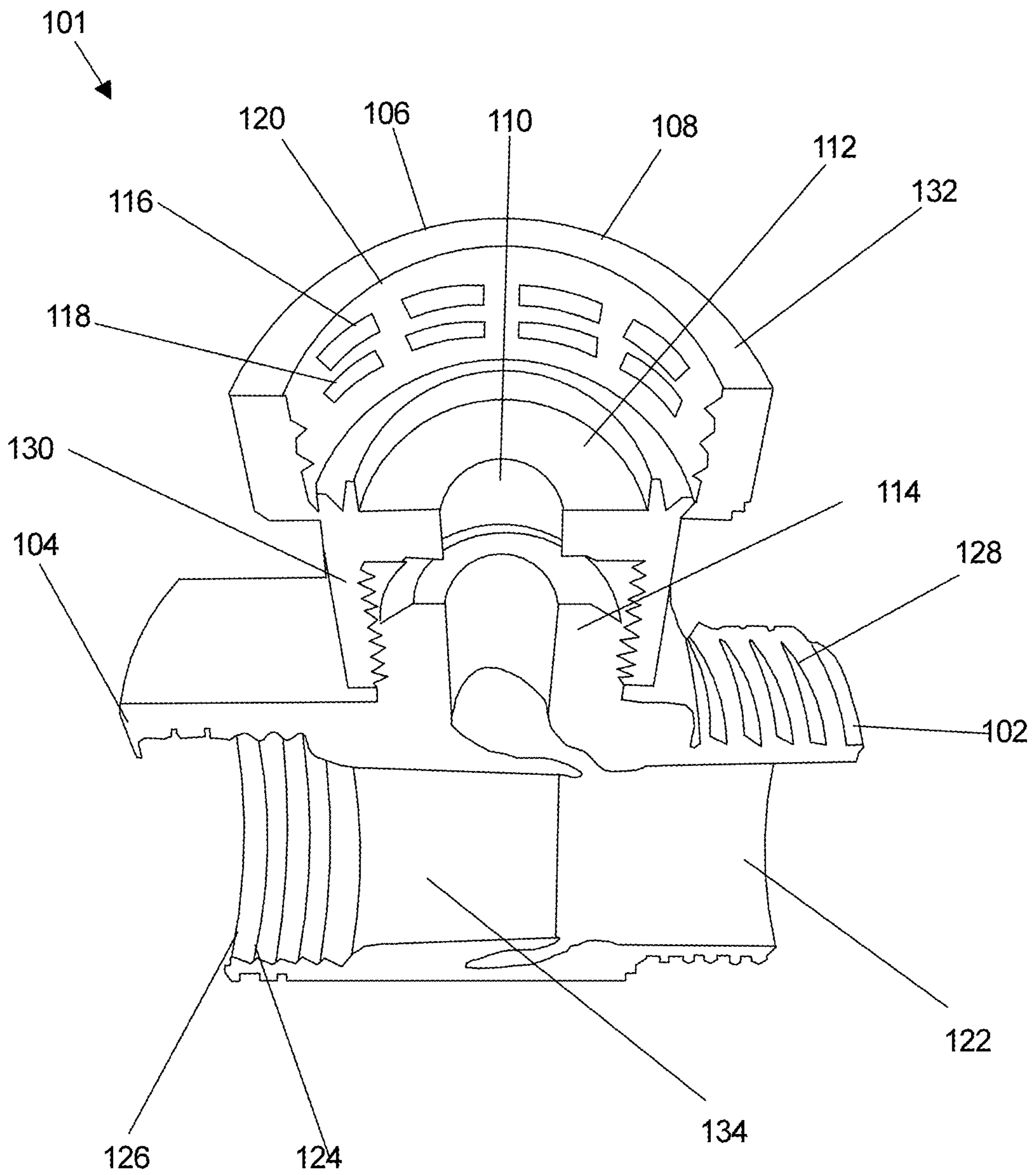
FIG. 1 is an angled side cross-sectional view of an embodiment of the disclosure.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood; however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood; however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Aspects of the disclosure provide both an apparatus and method for firefighting that addresses the needs to quickly extinguish complex fires that the industry faces. In embodiments, the apparatus provides a ready to use component that is applicable for use against fires that include both Class A and Class B materials. As will be understood, although described as being applicable to both Class A and Class B, other classes may be covered.

Aspects of the disclosure can eliminate the need and the precious time required to setup a heavy, 5-gallon, bucket of carcinogenic AFFF foam, typically stored on the top of the engine, to knock down a small or growing fire. Embodiments of the disclosure allow a firefighter to determine, "on-the-fly", whether to add a surfactant agent to the stream, with no pause in the current and ongoing normal, water-only, application operation. This early solution application greatly reduces the firefighting time by increasing early fuel penetration, via breaking up the water tension, and water-oil barriers, of the combustible liquids and melting plastic fuels which are typically saturating the area.

In one example embodiment, a twist of a control valve allows actuation of addition of a fire suppressant, thus the firefighter is immediately applying a soap, foam, or surfactant solution, with near zero impact to the current water flow delivery. When the appropriate amount has affected its purpose, a twist of the control valve shuts the additional suppressant off, and normal water application can resume uninterrupted, at the discretion of the firefighter at the end of the nozzle. If additional fire suppressant is needed, the firefighter can actuate the valve again until the desired affect has been achieved. Embodiments of the disclosure provide for a minimal weight difference while implementing the apparatus versus the standard nozzle operational setup. In embodiments, there is only a difference of under one (1) pound in total weight.

Embodiments of the disclosure are also applicable to other environments and as such, the application to urban environments should not be considered limiting. In embodiments, methods and apparatus described are applicable to less urban environments. As will be understood, with increases in population, there has been an increase in the incidence of large catastrophic wildfires. Oftentimes they occur in the ever-growing intersections of urban sprawl and Wildland Urban Interface (WUI). Thus, the incidence of wildland firefighters encountering more structures, infrastructure facilities, utilities, encampments, and municipal assets during forestry or wildland campaigns is exponentially growing. Embodiments of the disclosure are effective in this WUI environment. With less than one pound of additional person-portable gear, a Wildland firefighter can carry the apparatus in their outer jacket pocket or webbing harness tool belt, or can pre-connect the apparatus to their nozzle, and choose to utilize the apparatus to assist them in fighting any type of fire at their convenience. Due to the flexibility of the design of the apparatus, the firefighter is provided options and choices directly into their hands and at their discretion. These decisions can be performed at a distance from the fire engine, significantly improving overall firefighting ability compared to conventional apparatus. In embodiments, the firefighter can be upwards of 2000 feet from the engine, out of "line-of-sight", from their respective fire engineer.

Embodiments of the disclosure, as part of an original design concept as a fire plumbing appliance, is to assist delivering specific firefighting water surfactants or "wetting" agents to fire fuel loads about to undergo, or already undergoing, the fire development or combustion process (from the fire incipient stage through the fire free-burning stage, through the fire overhaul or decay stage, through to fire extinguishment). As will be understood, most firefighting responders arrive during the fire development or fire growth stage. Through application of embodiments of the disclosure, embodiments greatly reduce the time of the environmental impact of the products of combustion, and additionally increases the health and safety of firefighters directly involved in the firefight, across all different types of firefighting situations. Aspects of the disclosure increase the efficiency and effectiveness of water application to fire fuel, through increased saturation or "wetting" of the substance or fuel on fire. This also greatly reduces the time to extinguishment of those same fuels.

Different types of materials may be dispensed by aspects of the disclosure. The fire suppression industry currently uses different firefighting foam type classes to assist in extinguishing fire. Embodiments of the disclosure permit dispensation of Class A and Class B foams. Class A and Class B foams used in firefighting and are the most common and are implemented based on fuel type. Class A foam is used to fight normal, ordinary, combustible fires and is generalized as a "wetting" agent for ordinary combustibles. Class B foam (to include Aqueous film forming foam (AFFF); a known carcinogenic material containing per- and poly-fluoroalkyl substances (PFAS) is an industry standard used to fight Class B (combustible liquid or petroleum product) fires.

Aspects of the disclosure allow the engaged firefighter to choose to use any chosen surfactant (from ordinarily available liquid dish soap to AFFF) to have a similar desired effect as Class A or Class B foam solution. The apparatus, with a control valve feature, gives the engaged firefighter on the end of the firefighting hose line, an active real-time choice of whether to introduce their chosen, available, surfactant solution to the flowing stream, or, to just use the normally unmixed, supplied, water stream provided by the pump.

In one embodiment, the water flowrate impact while using the apparatus is negligible concerning friction loss, pressure loss, impact to water flow, and has virtually no impact to nozzle pressure based on its proximity placement location immediately after the nozzle control valve bale. This results in a near-zero-impact to normal water output flow and reach capability of the normal use of the hose line with normal water, compared to the limited reach and/or pump corrosion impact, when implementing the traditional foam firefighting method (e.g. via the cumbersome Akron Inline Foam Eductor device).

As compared to conventional systems that can have a limited range of 200 feet as previously described, aspects of the disclosure have a superior range of a factor of ten. Aspects of the disclosure may be implemented instantaneously at great distances from the fire pump without having any mixed solution pass through the actual pump or even the fire hoses themselves. The method used for dispersion does not require a coordinated communication effort for short-term use.

As is known in the industry, the use of foam degrades both pumps and hoses over time. It is therefore desired to minimize the use of foam while fighting fires to prevent wear of expensive equipment. Chemical degradation begins on immediate contact, and it is literally just a matter of time of contact before replacement is required. Some wildland firefighting campaigns can last days and weeks. Without proper water sources to adequately flush the pump and hose lines, degradation is almost certain. Aspects of the disclosure minimize the use of foam as the foam can be directly placed in areas needed remote from the pump. Such direct uses, impossible with conventional apparatus due to the range limitations, can minimize damage, thus saving precious maintenance costs.

Aspects of the disclosure are designed to be customized to accommodate standard firefighting pressures, thread-types, and sizing, for threaded male and female fittings, Stortz fittings, and different connection types for both handlines, and eventually, master streams on the input and output sides. In embodiments, a bottle may be used for supply of needed firefighting solution. In some embodiments, a supply tube may be used to connect the valving to the firefighting solution. The bottle or solution, supply, tubing threading may vary based on customized uses and order preference to accommodate the supply bottle or supply tube.

Different materials may be used to construct embodiments of the disclosure. In some embodiments, the described components are made of aluminum alloy with a chemical anodization applied layer, to protect against erosion, chemical degradation, and wear prevention. In other embodiments, other metal components may be used. In further embodiments, high temperature resistant materials may be used. Aspects of the design are also within the current NFPA (National Fire Protection Association) standards for fire appliances, fittings, and hose connections. Aspects of materials used for construction of solution carrying bottles may vary. In some embodiments, the refillable solution supply bottle will be constructed of a lightweight metal alloy, with a flexible internal polymer or plasticized coating, or insertable plastic solution-containing bag. The solution supply tube, bottle stopper, and one-way valve will be constructed of polymers, alloys, and/or butyl rubber.

Aspects of the disclosure increase firefighter life safety by giving the firefighter a choice. The active real-time choice to reduce the time involved in the firefight, to reduce the environmental damage of the byproducts of combustion into the environment, to choose any preferred agent or solution, with near zero impact, to normal firefighting operations and procedures.

One example embodiment of the apparatus will now be disclosed. As will be understood, variations of the disclosed apparatus may be performed. Referring to FIG. 1, an apparatus 100 is illustrated. In the illustrated embodiment, the apparatus 100 is used to transfer a fluid through a fluid pathway 134 while a second fluid may be inserted into the fluid pathway 134 through an internal bore 110 that is connected to a storage for the second fluid. The apparatus 100 is configured of a body 101. As will be understood, the body 101 may be made of a rugged material such as a metal or a high strength plastic. Since the body 101 is configured to channel fluids through the internal bore 110 and the fluid pathway 134, the material may be a corrosion resistant material so that numerous uses of the body 101 may be accomplished. In further embodiments, the body 101 material may be chosen to minimize the amount of weight that a firefighter may experience while moving the apparatus 100 to a firefighting location. In such environments where weight savings are needed, composite materials may be used. As will be understood, the apparatus 100 may be connected to a hose, such as a firefighting hose, for spraying fluids and materials onto a fire. In such applications, the apparatus 100 may be located near the nozzle of the firefighting hose. In applications, the apparatus 100 may be quickly connected and disconnected to the firefighting apparatus through use of a first end external threading 128, a second internal threading 126, as well as through a third end 106 that provides a first ridge ring 116 and a second ridge ring 118 for connection. The first ridge ring 116 and the second ridge ring 118 may accept connection of a container of fluid and materials that may be dispensed through the internal bore 110 to the fluid pathway 134. As will be understood, in accordance with one embodiment, the Bernoulli theorem may be used to proportionally provide fluid from the connection at the third end 106 through the internal bore 110 to the fluid pathway 134. Thus, when fluid passing through the second end 104 and the first end 102 is increased in velocity, fluid and materials traveling through the internal bore 110 and the third end 106 would increase. Similarly, when fluid flow through the second end 104 and the first end 102 is decreased, the amount of fluid and materials passing through the third end 106 to the fluid pathway 134 is reduced. The increase and decrease in flow at the first end 102 may be accomplished through known means such as a nozzle or a valve that is connected to the firefighting equipment. In other embodiments, the amount of pressure and/or quantity of water flow from a pumping truck or other firefighting equipment may be varied by an operator.

Further describing FIG. 1, the second end 104 is provided with a female connection that includes second end internal threading 126. The first end 102 is provided with an external first and external threading 128. As will be understood, other configurations may be provided and the illustration of male and female ends may be alternated or switched as needed. In further embodiments, joints may be provided at both the first end 102 and the second end 102 to prevent the need for screwing in apparatus using the first end external threading 128 in the second end internal threading 126. In a similar fashion, the third end 106 may be provided with alternative different types of connections on the interior surface or the exterior surface of the third end 106 to allow connection to a storage container for fluids and materials. Thus, the first ridge ring 116 and the second ridge ring 118 are merely illustrative examples of possibilities of potential connections or mechanical joints that may be used.

The third end 106 may be provided with a nut 130 to allow the third end 106 to be connected to the fluid and material storage container. The exterior of the third end 106 is provided with a textured surface 132 that allows for connection of the apparatus 100 to firefighting equipment through the use of glove and subsequent twisting of the collar 108. As shown further in FIG. 2, the textured surface 132 may be configured with serrations allowing for increased friction thereby allowing a gloved hand to connect the apparatus 100 to firefighting equipment. For the first end external threading 128 and the second end internal threading 126, the number of threads per inch used may be dictated by standard firefighting equipment specifications. In some embodiments, the number of threads per inch is minimized to allow for a quicker connection for rapid deployment. In other embodiments, the first end external threading 128 and the second end internal threading 126 may be provided with increased numbers of threads per inch to allow for a stronger connection. Such connections are advantageous in cases where the amount of water pumped is increased or desired at the firefighting location.

The embodiment provided may be installed by a firefighter in the field at the location of the fire or may be installed at a firefighting truck and then transported to the fire location through the firefighter carrying the apparatus 100 as connected to a firefighting hose. In embodiments, the apparatus 100 weighs under one pound, allowing the firefighter the ability to easily carry the apparatus 100 to the firefighting location. As will be understood, in cases where larger fires may be present, as well as larger firefighting equipment, the dimensions of the apparatus 100 may be increased to allow for greater amounts of fluid and materials to pass through the third end 106 into the fluid pathway 134 for firefighting activities.

In embodiments, a straight internal bore 110 is provided from the fluid end material storage location into the third end 106 to be eventually connected to the fluid pathway 134. In the illustrated embodiment, a first internal structure 112 is placed within the collar 108 while a second internal structure 114 is placed closer in proximity to the fluid pathway 134. In one embodiment, both the first internal structure 112 and the second internal structure 114 are provided with an identical or matching internal diameter. In other embodiments; however, the first internal structure 112 and the second internal structure 114 have different diameters; therefore, allowing a nozzle effect to occur for fluid materials passing through the internal bore 110 to the fluid pathway 134.

As will be understood, the nut 130 may be configured with surfaces on which a wrench or other tightening device may be installed or applied in order to establish a connection between the apparatus 100 and the container for fluid and materials storage. In embodiments, the exterior size of the nut may be in a metric or English standard unit dimensional size. The apparatus 100 may be disassembled into different component sections such as a collar 108, the nut 130, and the portion enclosing the fluid pathway 134. In such instances, the individual portions of the apparatus 100 allows for replacement of worn parts. In order to provide for a greater service length for the apparatus 100, the interior portions of the collar 108, the fluid pathway 134, and the connecting fluid channels may be coated with a material to prevent corrosion. For portions of the apparatus 100 that may exhibit mechanical connections such as the first end external threading 128, the second end internal threading 126, the collar 108, the first ridge ring 116, and second ridge ring 118, as well as the exterior surface of the nut 130, these portions may be made of hardened steel or may be treated such that the exterior surfaces are not prone to mechanical damage from wear. The exterior surfaces, in some embodiments, may be flame hardened, induction hardened, carburized, or nitrided.

In other embodiments, other hardening measures may be performed on internal or external portions of the apparatus 100. Such hardening measures may include, but not be limited to, laser hardening, electron beam hardening, and ion implantation hardening.

Portions of the apparatus 100 may be made through economical production methods to reduce the entire cost of the apparatus. Forming of the components may be done through various metal forming processes, including stamping, punching, extrusion, roll forming, deep drawing, bending, open die forging, and casting.

In further embodiments, the entire apparatus 100 may be created through the process of three dimensional printing techniques. In such techniques, the dimensions of the components may be saved into a file or program and a computer guided manufacturing device may lay successive layers of materials, thereby forming the overall apparatus 100. Such forming techniques may use different metals, alloys or other rugged materials in the forming process. In still other embodiments, metamaterials exhibiting exceptional strength capabilities may be used in such forming processes.

The apparatus 100 may be configured and designed according to different fire protection standards including, but not limited to, the National Fire Protection Association "NFPA" and the Occupational Safety and Health Administration "OSHA" regulations. As will be understood, other standards may be used including those originating outside the United States, and the described fire protection standards should not be considered limiting.

Figure 2:
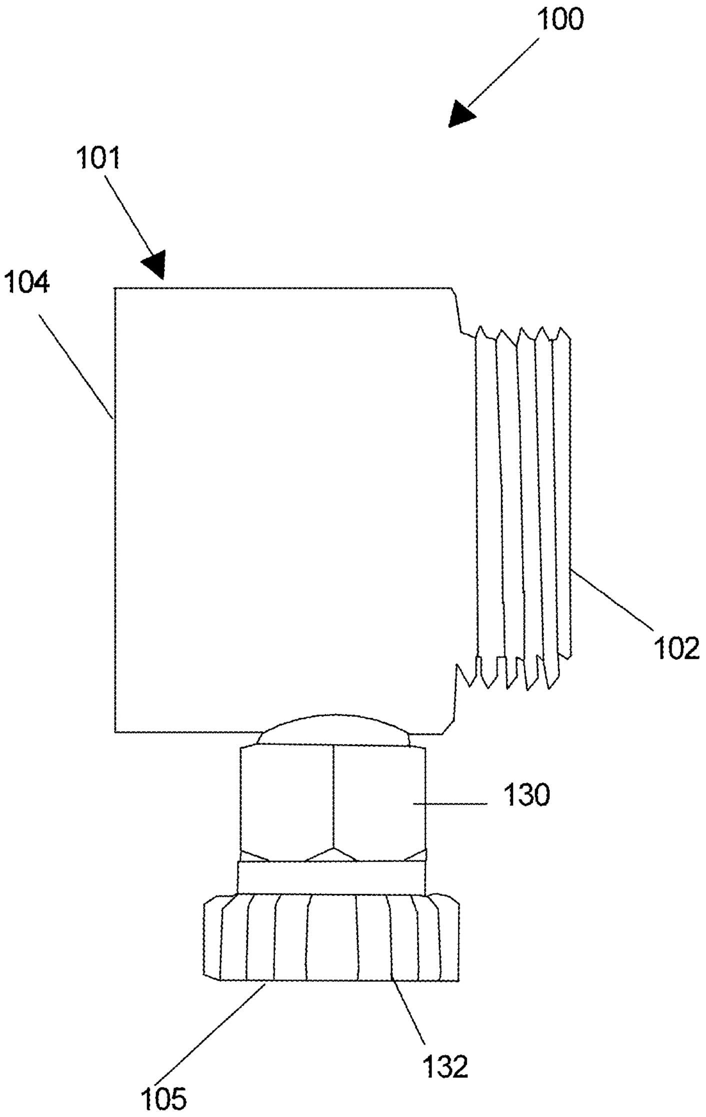
FIG. 2 is a side view of the embodiment of FIG. 1.

Referring to FIG. 2, the apparatus 100 is illustrated in a side view. In the side view, the apparatus 100 is provided with a second end 104 that has a female connection with a second end internal threading 126 as seen in FIG. 1. The exterior portion of the first end 102 is provided with first end external threading 128. Connection may be established with a fluid and material storage unit at the third end 106. A textured surface 132 is provided on the collar 108 of the third end 106 to allow tightening and disconnection of the apparatus 100 to the fluid and material storage. The fluid and material storage unit may be a canister that contains chemicals used for fighting fires. The canister may have an interior that contains materials, at a designated pressure. The designated pressure may be higher than the pressure exerted on the apparatus 100 exit channel 302, as illustrated more clearly in FIG. 4.

Figure 3:
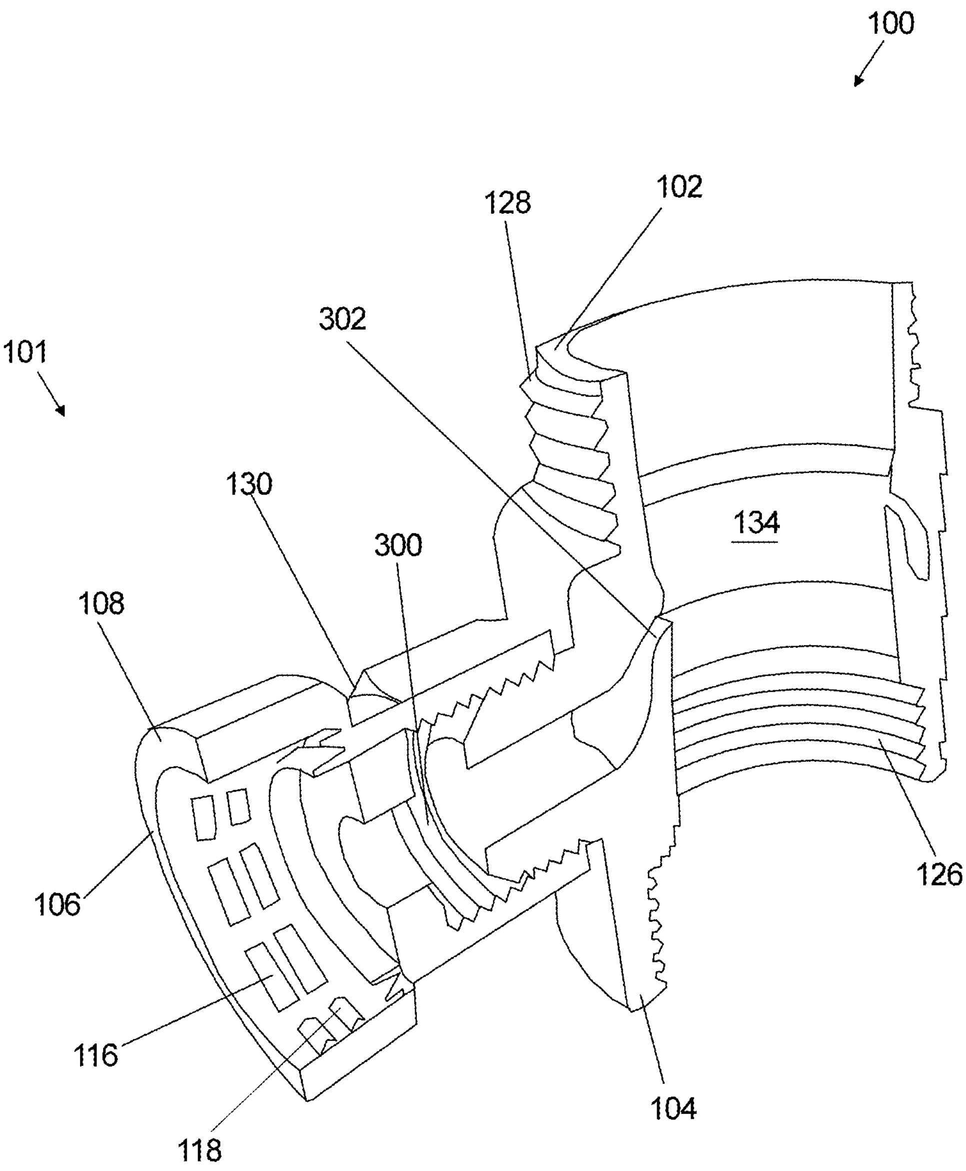
FIG. 3 is a top perspective cross-sectional view of the embodiment of FIG. 1.

Referring to FIG. 3, a top angled view of the apparatus 100 is illustrated. In this illustration, the fluid pathway 134 is illustrated between the first end 102 and the second end 104. In the illustrated embodiment, a lip exists between the fluid pathway 134 and the adjoining first end 102. Other configurations are possible, including a more substantial lip separating the first end 102 and the fluid pathway 134. In still other configurations, no lip is provided between the first end 102 and the fluid pathway 134.

In the location of the nut 130, threads 300 may be used for connection between the nut 130 and the remainder of the body 101 of the apparatus 100. As will be understood, counter-rotating threads may be used on either side of the nut 130 such that tightening of one portion of the body 101 does not necessitate loosening of another portion of the body 101. Such counter-rotating threads should be considered as a feature that may be added or deleted, as necessary.

As illustrated, the body 101 may have different thicknesses in different sections of the body 101. For instance, areas of the nut 130 may have a different thickness than the collar 108. Although shown as having a reduced wall thickness at the first end external threading 128 and the second end internal threading 126, contemplated alternatives include thickened threading areas such that the overall pressure capability of the body 101 is not design limited at the threading portions of the apparatus 100.

Figure 4:
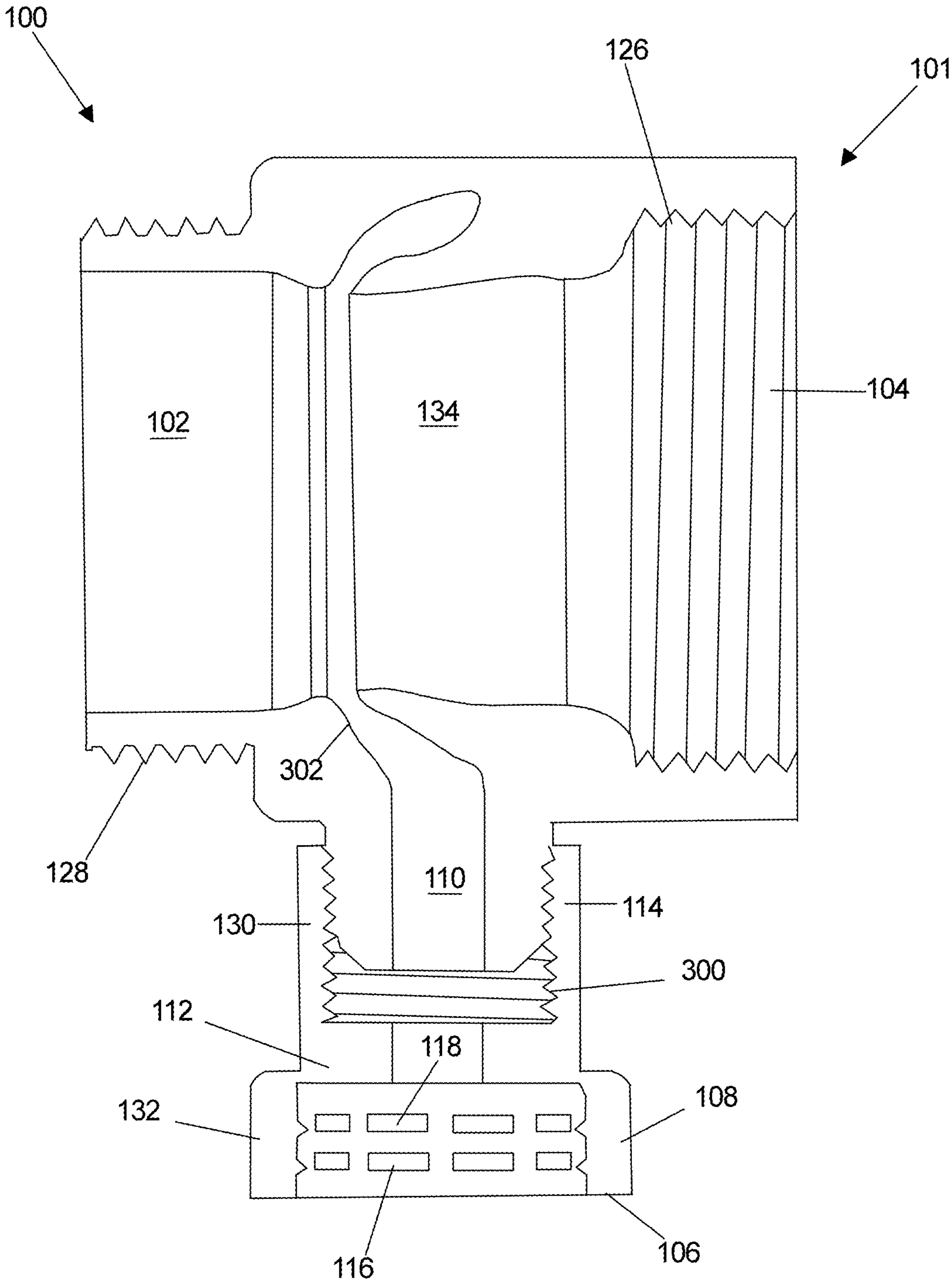
FIG. 4 is a side cross-sectional view of the embodiment of FIG. 1.

Referring to FIG. 4, a cross-section of the body 101 of the apparatus 100 is illustrated. An exit channel 302 is provided connecting the internal bore 110 to the fluid pathway 134. As illustrated, the exit channel 302 is curved in shape. Other embodiments are contemplated, including straight or complex shapes. In other embodiments, an obstruction may be placed near or in the exit channel 302 to create an area of low pressure to help fluid flow from a higher-pressure area within the fluid storage to the fluid pathway 134.

In some embodiments, the exit of the exit channel 302 may be partially covered from the fluid flowing in the fluid pathway 134 creating a lower pressure area. The exit may be created by any geometric shape allowing for a metering of fluid/materials through the exit channel 302.

In further embodiments, an adjustment mechanism may be added to the exit of the exit channel 302, thereby creating a larger or smaller exit. This would have the ability to change the amount of fluid metered into the working stream at the desire of the firefighter. Such opening and closing may be accomplished through a manually actuated mechanism, such as a lever or through other mechanical actuation, such as a spring. In embodiments that allow the firefighter to change the exit channel, advantages include minimizing hydraulic thrust of materials from the storage container due to sudden release of fluids through the exit channel 302.

In one example embodiment, a method is described. The method provides for adding a fluid to a stream of water for fighting a fire. Embodiments of the method may be accomplished at or near the exit nozzle of the hose. The nozzle may be positioned at a considerable distance, for example up to 2000 feet from the pumping truck/fire engine. Conventional apparatus cannot perform such a task and require the mixture of two fluids at the pump thereby delivering two fluids simultaneously.

In embodiments, the method may actuate or initiate the flow of a fluid that may be added to the working stream of water pumped from a remote location. The firefighter at the nozzle may choose to initiate a flow of two fluids or may choose to only have a one fluid stream. In further embodiments, the firefighter may alternatively start and stop and then start the process of flowing two fluids at his/her choice.

In embodiments, the addition of the second fluid to the working stream of water may be accomplished through the Bernoulli principle that will add fluid according to the flow of fluid that is passing around an obstruction placed within the fluid flow path of the working fluid. As will be understood, an obstruction placed within a fluid flow path creates a high pressure point at the leading edge of the obstruction as well as a low pressure point at the trailing edge of the obstruction. While obstructions placed within fluid flow paths generally are round in shape, other shapes may be located within the fluid flow path.

When the pressure of the second fluid is stored at a pressure that is higher than the lower pressure within the fluid flow path, the pressure differential causes fluid to flow from the higher pressure location to the lower pressure location. During steady state operations where the working fluid is traveling at a constant speed, the overall pressure differential between the low pressure point at the obstruction and the storage pressure will be constant, thereby causing a steady flow of fluid from the storage location to the exit point at the lower pressure location.

In embodiments, the flow of fluid from the storage container to the nozzle is related to the amount of fluid flow by the working fluid that creates the overall pressure differential. Increases in the overall pressure differential between the fluid storage and the location of the obstruction are achieved by increasing the fluid flow rate of the working fluid. Similarly, lesser amounts of fluid flow of the working fluid will decrease the pressure differential between the storage location and the obstruction, thereby decreasing the amount of fluid flowing from the storage location.

In some embodiments, the nozzle at the fire hose may limit both the working fluid (water) and the secondary fluid from the storage location. To this end, the amount of complexity of the design is minimized, achieving a modest increase in overall weight at the nozzle. In testing, a modest increase of only one pound was achieved, thus minimizing the overall downstream weight for the firefighter while greatly adding firefighting capabilities compared to conventional apparatus.

Figure 5:
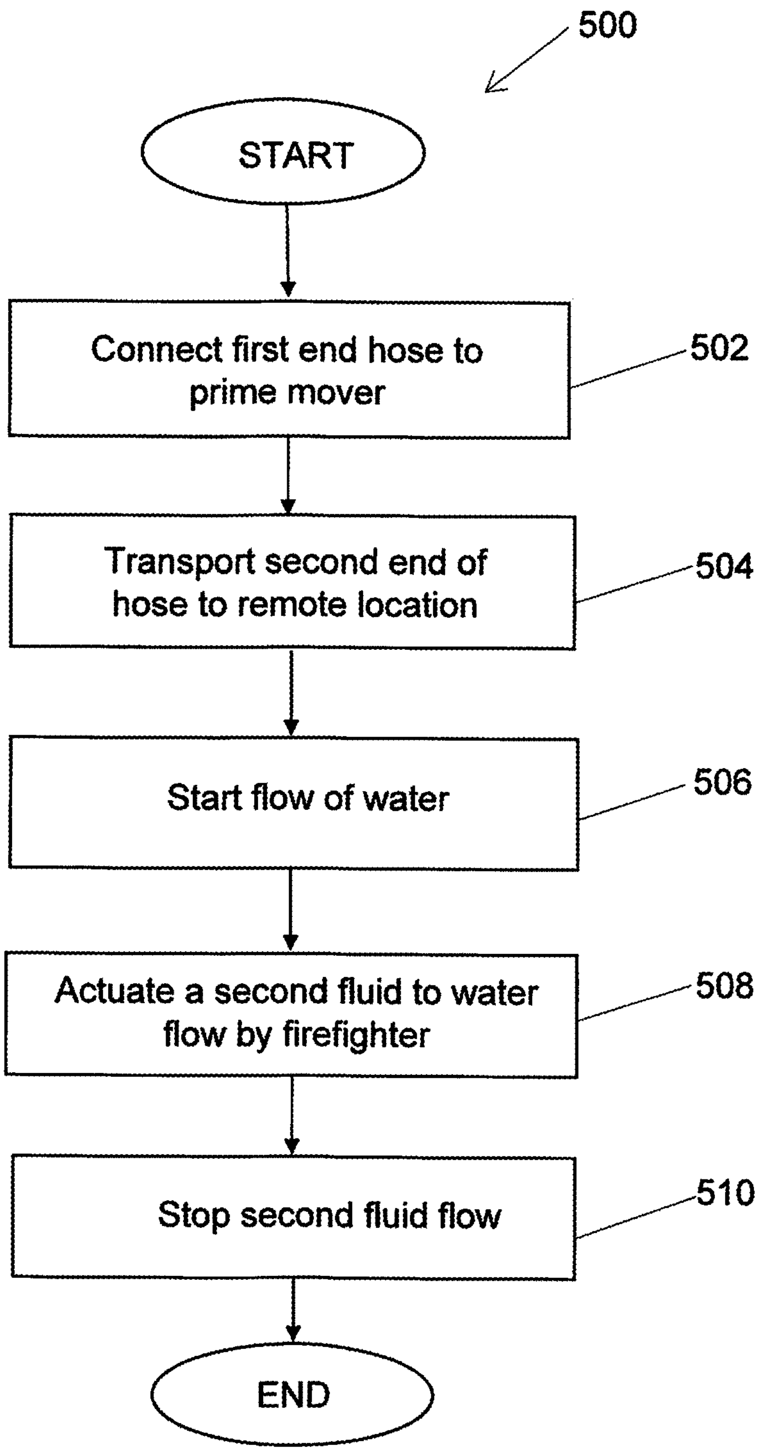
FIG. 5 is a method of fluid dispersion in accordance with one example embodiment of the disclosure.

Referring to FIG. 5, a method 500 for dispersion of a fluid for fighting a fire is illustrated. The method 500 may entail, at 502 connecting a hose at a first end with a prime mover. The prime mover may be a pump configured to pump fluid, such as water. The prime mover may be a fire engine or a pump truck. The prime mover may also be a fire hydrant or other location that has a water pressure sufficiently great to transport water through the connected hose. At 504, the method may further provide for transporting a nozzle at a second end of the hose to a location remote from the prime mover. As stated above, the distance may be a large distance, such as up to 2000 feet away from the prime mover. At 506, the method may further provide for starting a flow of water from the prime mover through to the nozzle at the second end of the hose. At 508, the method may further provide for actuating a flow of a second fluid to be added to the flow of water, wherein an amount of the second fluid added to the flow of water may be controlled by a firefighter. The control may be through actuation of a valve thereby allowing the second fluid to be added to the first. A pressure differential may be used to transmit the second fluid from a storage location to the flow of water. Pressure differential may be through the Bernoulli principle. At 510, the method may further provide for stopping the flow of the second fluid at the discretion of the firefighter.

As provided above, the storage location for the secondary fluid may be a canister attached to the nozzle. Larger or smaller canisters may be used to provide greater or lesser amounts of secondary fluid to be added. The method may be accomplished by a firefighter using the apparatus previously described.

The embodiments described provide an apparatus that does not have the time-intensive set-up of conventional apparatus.

The embodiments described also provide a method for firefighting that saves precious time compared to conventional methods.

The embodiments of the apparatus as well as the methods provide a firefighting apparatus and methods that are quickly and easily deployable by firefighters to control fire spread.

The embodiments described provide apparatus and methods to fight fires that may be used with current firefighting equipment.

The embodiments described provide firefighting apparatus that do not have the drawbacks discussed above.

The embodiments described reduce overall economic costs associated with firefighting operations and apparatus described above with conventional tools.

Aspects of methods described may be performed, at least in part, by automated systems. Instructions for the control of automated systems may be included onto a non-volatile memory system. For definitional purposes, a non-volatile memory system may be a memory system that does not wipe clean after termination of electrical power to the system. Examples of non-volatile memory systems may be compact disks, solid-state drives, and universal serial bus devices. These memory systems may be used to store program, executable, method steps for a computer, server, or computing arrangement.

Additional embodiments of the disclosure may minimize the individual number of components, such as the nut of the above-described embodiments. In such embodiments, a connection between the fluid storage cannister and the working fluid may be accomplished by a configuration with a distribution channel connecting the storage cannister and a collar transporting the working fluid (water). In non-limiting embodiments, configurations of a single piece collar and storage cannister connector may be implemented along a set of parallel axes. Such configurations may include a shut off to stop potential working fluid flow when a cannister is not used. In such embodiments, the collar may be installed at all times on the hose therefore only necessitating that the fire fighter attach a cannister and open a valve dispensing additives to the working fluid. Materials within the canister for all embodiments may be an environmentally friendly mixture of components that is non-toxic.

Example embodiments of the claims are described next. The discussion of the particular embodiments should not be considered to limit the aspects of the disclosure. In one non-limiting embodiment, a method for dispersion of a combination of fluids while fighting a fire is disclosed. The method may comprise connecting a hose at a first end with a prime mover. The method may also comprise transporting a nozzle at a second end of the hose to a location remote from the prime mover. The method may also comprise starting a flow of water from the prime mover through the hose to the nozzle at the second end of the hose. The method may also comprise actuating a flow of a second fluid to be added to the flow of water, wherein an amount of the second fluid added to the flow of water may be controlled by a firefighter.

In another non-limiting embodiment, the method may be performed wherein the prime mover is one of a fire engine, a pump truck, and a fire hydrant.

In another non-limiting embodiment, the method may be performed wherein the actuation of the flow of the second fluid is through a valve actuation.

In another non-limiting embodiment, the method may be performed wherein an amount of the second fluid that is added to the flow of water is performed through a Bernoulli principle.

In another non-limiting embodiment, the method may further comprise stopping the second fluid by actuation of the firefighter.

In another example embodiment, an apparatus is disclosed. The apparatus comprises a body having a first end, a second end, and a third end, wherein the first end has external mating threads and the second end has internal mating threads. The apparatus further comprises a nut connected to the body. The apparatus further comprises a collar connected to the nut at the third end, wherein the body has a fluid pathway extending from the first end to the second end and an internal bore is established from the third end through the collar and the nut to intersect the fluid pathway.

In another example embodiment, the apparatus may be configured, wherein the body is made of a metallic material.

In another example embodiment, the apparatus may be configured, wherein the third end has an internally defined mechanical connection.

In another example embodiment, the apparatus may be configured, wherein the internally defined mechanical connection has a first ridge ring and a second ridge ring.

In another example embodiment, the apparatus may be configured, wherein the internal bore has an exit channel that intersects the fluid pathway.

In another example embodiment, the apparatus may be configured, wherein the exit channel is configured with at least one curve.

In another example embodiment, the apparatus may be configured, wherein the body is configured with a mating surface that interacts with an interior surface of the nut to form a mechanical connection.

In another example embodiment, the apparatus may be configured, wherein the body mating surface is an exterior threaded surface that interacts with an interior threaded surface of the nut to establish a mechanical connection.

In another example embodiment, the apparatus may be configured, such that within the nut, at least one internal structure is situated along the internal bore.

In another example embodiment, the apparatus may be configured, wherein the at least one internal structure are two internal structures and the two internal structures together form a nozzle along the pathway of the internal bore.

In another example embodiment, an apparatus is disclosed. The apparatus comprises a body having a first end, a second end, and a third end, wherein the first end has external mating threads and the second end has internal mating threads. The apparatus further comprises a nut connected to the body at the third end. The apparatus further comprises a collar connected to the nut, wherein the body has a fluid pathway extending from the first end to the second end and an internal bore is established from the third end through the collar and the nut to intersect the fluid pathway, and wherein the collar is configured with a mechanical connection that will transport a fluid through the collar, the nut and into the fluid pathway, thereby mixing a first fluid stream traveling along the fluid pathway and a second fluid stream flowing along the internal bore and further comprising an exit channel that establishes a connection between the fluid pathway and the internal bore, wherein the exit channel that has a curvilinear shape.

In another example embodiment, the apparatus may be configured, wherein at least one of the first end and the second end have a threaded surface to establish a mechanical connection to firefighting equipment.

In another example embodiment, the apparatus may be configured, wherein an interior of the collar is configured to establish a mechanical connection to a fluid cannister.

In another example embodiment, the apparatus may be configured, wherein the mechanical connection is configured, at least in part, through at least one ridge ring located within the collar.

In another example embodiment, the apparatus may be configured, wherein the apparatus is configured from at least one of metallic materials, alloy materials, and composite materials.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. An apparatus, comprising:

a body having a first end, a second end, and a third end, wherein the first end has external mating threads and the second end has internal mating threads;

a nut connected to the body; and a collar connected to the nut at the third end, wherein the body has a fluid pathway extending from the first end to the second end and an internal bore is established from the third end through the collar and the nut to intersect the fluid pathway wherein the internal bore has an exit channel that intersects the fluid pathway, and the exit channel has at least one curve.

2. The apparatus according to claim 1, wherein the body is made of a metallic material.

3. The apparatus according to claim 1, wherein the third end has an internally defined mechanical connection.

4. The apparatus according to claim 3, wherein the internally defined mechanical connection has a first ridge ring and a second ridge ring.

5. The apparatus according to claim 1, wherein the body is configured with a mating surface that interacts with an interior surface of the nut to form a mechanical connection.

6. The apparatus according to claim 5, wherein the body mating surface is an exterior threaded surface that interacts with an interior threaded surface of the nut to establish the mechanical connection.

7. The apparatus according to claim 1, wherein within the nut at least one internal structure is situated along the internal bore.

8. The apparatus according to claim 7, wherein the at least one internal structure is two internal structures and the two internal structures together form a nozzle along the pathway of the internal bore.

9. An apparatus, comprising:

a body having a first end, a second end and a third end, wherein the first end has external mating threads and the second end has internal mating threads;

a nut connected to the body at the third end; and a collar connected to the nut, wherein the body has a fluid pathway extending from the first end to the second end and an internal bore is established from the third end through the collar and the nut to intersect the fluid pathway, and wherein the collar is configured with a mechanical connection that will transport a fluid through the collar, the nut and into the fluid pathway thereby mixing a first fluid stream traveling along the fluid pathway and a second fluid stream flowing along an internal bore and further comprising an exit channel that establishes a connection between the fluid pathway and the internal bore, wherein the exit channel that has a curvilinear shape.

10. The apparatus according to claim 9, wherein at least one of the first end and the second end have a threaded surface to establish another mechanical connection to fire-fighting equipment.

11. The apparatus according to claim 9, wherein an interior of the collar is configured to establish the mechanical connection to a fluid cannister.

12. The apparatus according to claim 11, wherein the mechanical connection is configured, at least in part, through at least one ridge ring located within the collar.

13. The apparatus according to claim 9, wherein the apparatus is configured from at least one of metallic materials, alloy materials, and composite materials.

* * * * *